United States Patent [19]

Marsh et al.

[11] Patent Number: 4,875,358

[45] Date of Patent: Oct. 24, 1989

[54] PREPARATION OF CONDOMS BY THE USER

[75] Inventors: Stephen A. Marsh, Watertown, Mass.; Robert W. Young, Locust Valley, N.Y.

[73] Assignee: Stephan Marsh, Waltham, Mass.

[21] Appl. No.: 53,203

[22] Filed: May 21, 1987

[51] Int. Cl.⁴ .............................................. G01M 3/26
[52] U.S. Cl. ....................................................... 73/40
[58] Field of Search .......................... 73/40, 37, 49.8; 128/79, 132 R; 604/349

[56] References Cited

U.S. PATENT DOCUMENTS

| | | | |
|---|---|---|---|
| 682,183 | 9/1901 | Etheridge | 73/40 |
| 1,503,411 | 7/1924 | Zimmerman | 73/40 B |
| 2,074,140 | 3/1937 | Bates | 73/37 |
| 2,273,489 | 2/1942 | Holmes | 223/67 |
| 2,370,945 | 3/1945 | Fields | 73/40 |
| 2,567,926 | 9/1951 | Dunkelberger | 73/40 |
| 3,081,620 | 3/1963 | Glass | 73/40 |
| 3,282,776 | 11/1966 | Kitzke et al. | 424/45 |
| 3,315,519 | 4/1967 | Ferguson | 73/40 |
| 3,496,938 | 2/1970 | Furusc et al. | 128/127 |
| 3,907,012 | 9/1975 | Burke | 137/223 |
| 3,991,604 | 11/1976 | Hayes et al. | 73/37 |
| 3,992,766 | 11/1976 | Field | 53/117 |
| 4,206,631 | 6/1980 | Nysse et al. | 73/40 |
| 4,415,548 | 11/1983 | Reddy | 128/132 R |
| 4,626,286 | 12/1986 | Lubbs | 128/132 R |
| 4,678,658 | 7/1987 | Casey et al. | 424/43 |

FOREIGN PATENT DOCUMENTS 111748 7/1983 Japan ................................ 324/71.1

Primary Examiner—Hezron E. Williams

[57] ABSTRACT

Device and method for preparation of a condom by a user. The device defines a circular surface adapted to receive the annular ring of a condom in retaining or sealing relationship and gas inflation source is provided for producing a gas flow into the condom. By producing a pressure level to cause a detectable loss of air if the membrane has porosity in excess of a predetermined maximum degree the user can effectively test the condom for leaks. By associating the gas inflation sources with a composition selected to reside in the condom during use and effective against sperm or disease organisms, the user may achieve an improved degree of protection. The devices shown define an elongated, generally cylindrical forming member, which may be nestable annular elements, which extends from the circular surface that is engaged by the ring of the condom into the tubular membrane, adapted to support the condom to enable it to be unrolled into position for treatment and rerolled upon itself into compact form ready for use. Both a bellows and an aerosol can are shown for inflation and for injecting the active fluid composition. A storage compartment for pre-prepared condoms is advantageously provided in the device.

22 Claims, 2 Drawing Sheets

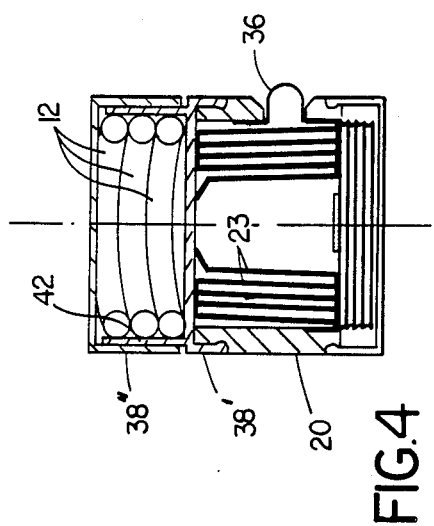
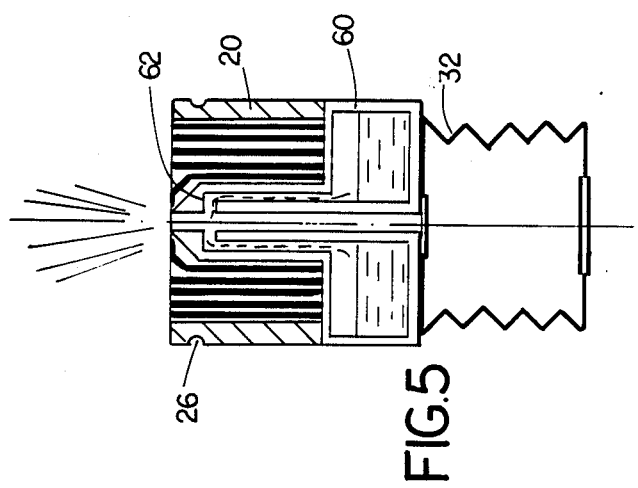
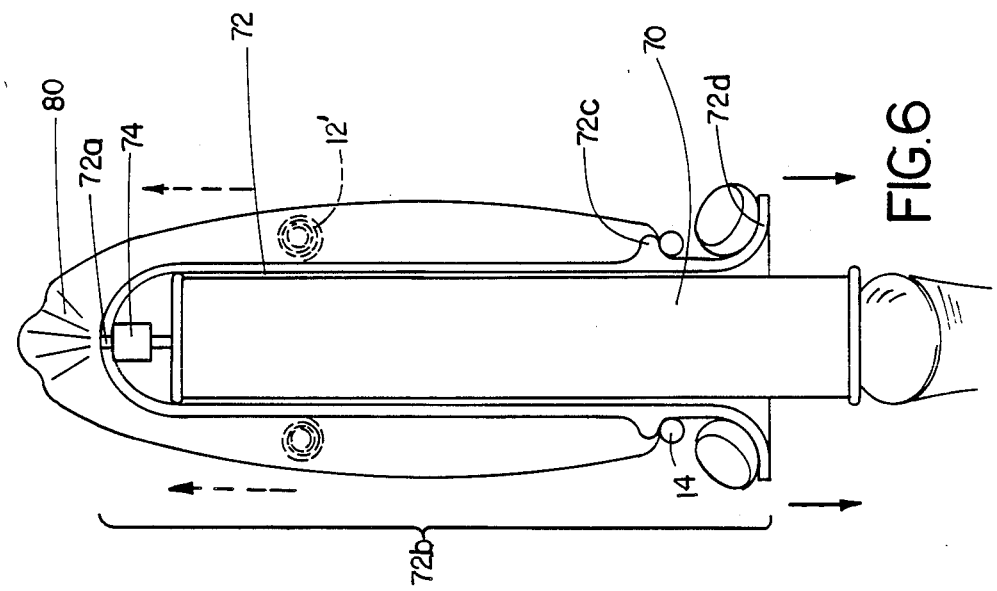

PREPARATION OF CONDOMS BY THE USER

As is well known, condoms typically comprise an elongated, generally tubular, thin membrane which is closed at one end and terminates at an annular ring at the other end, the condom being in a rolled, compact form prior to use. Condoms are employed both for contraception, and, with increasing frequency, as a means for "safe sex", for reducing the risk of sexually transmitted disease, such as acquired immune deficiency syndrome ("AIDS").

In order to provide the desired protection, it is important that the condom membrane be free of holes and/or be effective against disease organisms and sperm. It has been reported that approximately 10 to 12 percent of new condoms contain minute holes which do not show up as leaks when the condom is unstretched but which stretch into sufficiently large holes capable of permitting infection or leakage as the condom is flexed while being worn.

SUMMARY OF THE INVENTION

According to one aspect, the invention comprises a device having a ring-receiving surface adapted to receive the annular ring of the condom in sealing or retaining relationship and further adapted to define, with the membrane, a chamber, and gas inflation means for creating an inflating condition in the chamber. In a preferred embodiment the gas inflation means is adapted, in conjunction with the chamber, to produce pressure of a level predetermined to cause a detectable loss of air from the chamber through the membrane if the membrane has porosity in excess of a predetermined maximum permissible degree, and the device includes means enabling detection of loss of air from within the chamber. In another preferred embodiment the gas inflation means is adapted to produce a flow of gas into the condom that delivers a composition to reside in the condom during use which is effective against sperm and disease organisms.

Preferred embodiments have the following features. The device has an elongated, generally cylindrical forming member which extends from the circular surface into the tubular membrane, the forming member adapted to support the condom to enable it to be rolled upon itself into compact form after being subjected to inflating condition. In certain preferred embodiments, the means defining the forming member is collapsible when not in use, preferably comprising a set of annular elements adapted to telescope between an extended, form-defining position and a storage position of reduced size, the forming member preferably comprising a nest of consecutively smaller tubular sections. The ring-receiving surface has a circumference greater than the inner circumference of the ring of the condom in relaxed state. The inflation means comprises a bellows or other air pump and a one way valve for producing flow of air into the chamber, preferably the bellows being axially aligned with the cylindrical forming member, and preferably the generally circular surface further defines an annular rib for gripping between index and second fingers while the thumb actuates the air pump. In other embodiments, the inflation means comprises an aerosol can, preferably the exterior of the cap or other structure of the can being sized to enter the tubular condom to serve as the forming member upon which the condom may be unrolled and rerolled. The device comprises a cap defining a compartment for storage of one or more prepared condoms rolled into compact form. In still another embodiment provision is made to inflate the condom by the lungs of the user.

According to another aspect of the invention, a method for the user to prepare a condom having an annular ring about the open end of a tubular membrane comprises providing a circular surface for engaging the ring, placing the condom membrane so that it engages the generally circular surface in a retained relationship, and producing a flow of gas into the condom which carries with it a composition, to reside in the condom during use, which is effective against sperm and disease organisms.

In a preferred embodiment of the method an elongated, generally cylindrical forming member is associated with the circular surface and the condom is unrolled and rolled with the aid of the support provided by the cylindrical form. The forming member may advantageously be or be supported by the exterior surface of the cap or other structure of an aerosol can which is sized to enter the condom.

According to another aspect of the method of the invention, for testing the integrity of a condom having an annular ring about the open end of a tubular membrane desired to be nonporous, the method comprises providing a circular surface for engaging the ring in sealing relationship to define a pressure chamber, providing an elongated, generally cylindrical forming member associated with the circular surface, placing the condom membrane over the forming member, until the ring of the condom engages the generally circular surface in sealing relationship, creating an inflating pressure condition in the condom of a level predetermined to cause detectable loss of air through the membrane if the membrane has porosity in excess of a predetermined maximum degree of porosity, and, for a predetermined period of time, monitoring for loss of air. In a preferred embodiment, the method comprises the further step of rolling the ring from the circular surface axially along the forming member, to roll the membrane about the ring to form a compact condom package after testing.

According to another aspect of the invention, a device for preparation of a condom comprises an aerosol can sized and shaped to enter the condom, the aerosol can containing a propellant and a composition effective against disease organisms, the composition adapted to reside in the condom during use. In a preferred embodiment, the device includes a circular sealing means on the can adapted to engage the ring of a condom to form a seal or to securely retain the condom prior to actuation of the aerosol can.

Thus there is provided by the invention a device and method for quickly and efficiently testing condoms at pressures that will cause leaks due to the presence heretofore undetectable minute holes, without appreciably stretching the condom during the process, and of equal or greater importance, a device and method for applying effective compositions against the AIDS virus and other factors.

These and other features of the invention will be understood from the following description of preferred embodiments, and from the claims.

PREFERRED EMBODIMENT

We first briefly describe the drawings.

Drawings

FIG. 4 shows another preferred embodiment with a condom storage compartment included in a cap;

Figure 1:
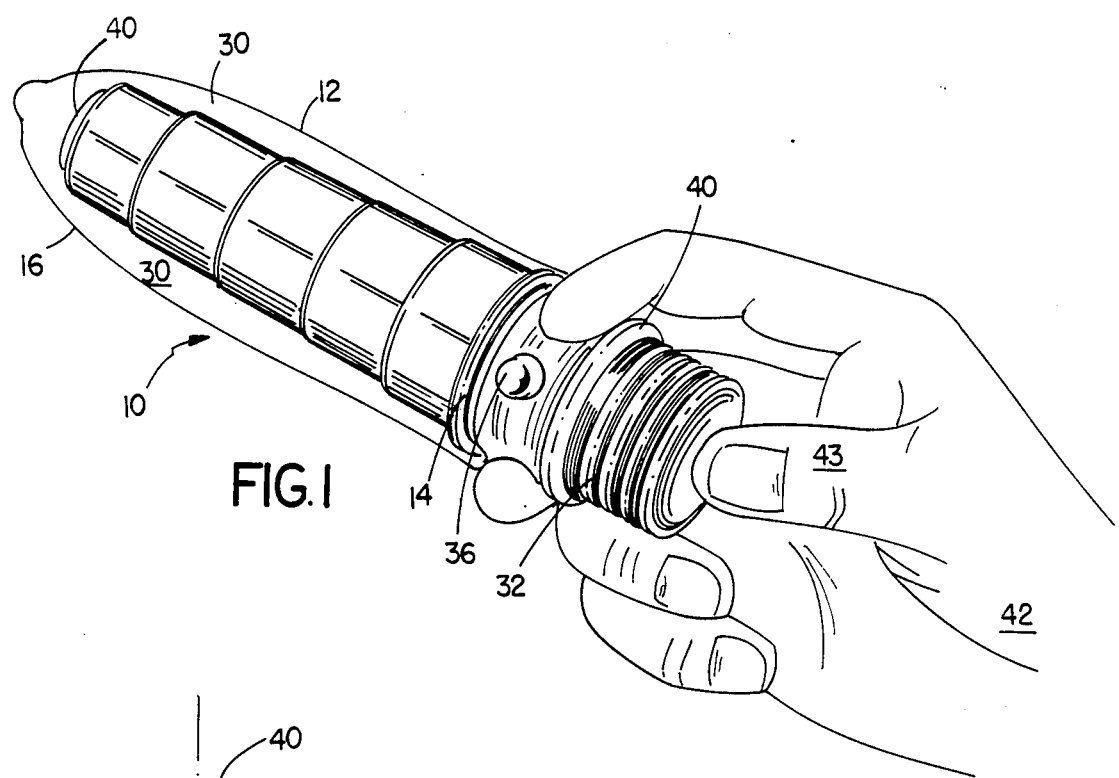
FIG. 1 is a perspective view of a preferred embodiment of the invention assembled with a condom, for integrity testing.

FIG. 5 shows a reservoir for a disease-combating composition to be propelled into the condom; and FIG. 6 shows another preferred embodiment for applying a disease combating composition to the interior of a condom and facilitating unrolling and rerolling of the condom. Referring to FIG. 1, device 10 is adapted to enable a user to unroll a condom, test for leakage and reroll the condom into a convenient compact form, ready for use. The condom 12 consists of an annular ring 14 about a tubular, thin membrane 16 which is closed at the opposite end. The device of the invention permits a consumer to simply detect the presence of a degree of membrane porosity in excess of a predetermined maximum.

Figure 2:
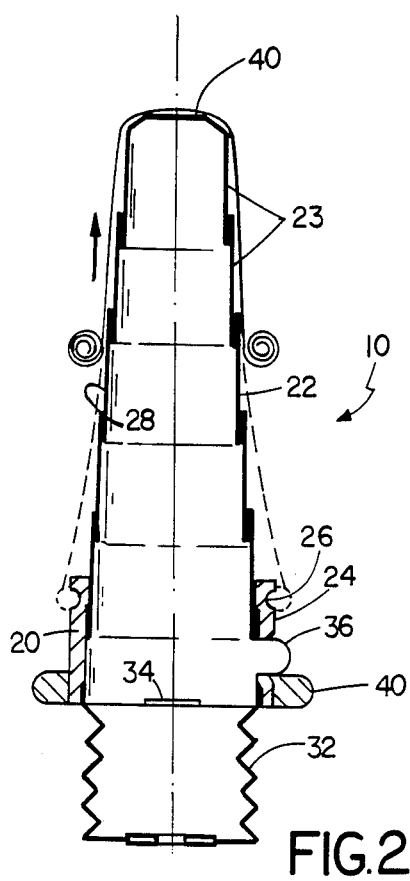
FIG. 2 is a side view in section of the device of FIG. 1.
Figure 3:
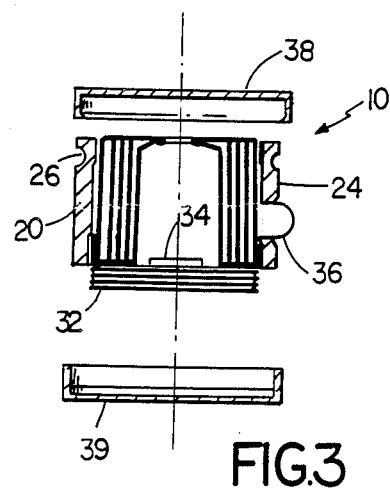
FIG. 3 is a similar view of the device in condition for storage or transport.

Referring also to FIGS. 2 and 3, the integrity testing device 10 comprises a cylindrical base 20 and a forming member 22. The base defines a circular outer surface 24 with a groove 26 of circumference greater than the inner circumference of the ring 14 of the condom in its relaxed state, whereby, upon assembly for testing, the ring is received about the surface 24 in sealing relationship. Form member 22 comprises a set of interlocking, annular, tubular elements 23 of consecutively decreasing diameter adapted to telescope between an extended position (FIG. 2), with the outer surface 28 defining a shape generally corresponding to that of the condom membrane, and a compact storage position (FIG. 3), with elements 23 nested generally within the confines of the base 20.

The pressurizing means shown in FIGS. 1-3 comprises a thumb operated bellows 32 axially aligned with the forming member and flap-type one-way valve 34, provided for creating an inflating pressure condition within the chamber. An annular rib 40 on the exterior of the base is adapted to be grasped by the index and second finger while the thumb actuates the bellows. Indicator 36, e.g., as shown, a flexible diaphragm, is adapted to deform resiliently outwardly in the presence of pressure within the base above a predetermined level.

Top and bottom caps 38, 39, sized to snap fit upon the base, close the ends of the device and provide a compact unit for discrete storage and transport.

The integrity testing device 10 of the invention permits the user to ensure that the membrane of the condom does not have porosity in excess of a safe degree.

For testing of a condom, the top cap 38 is removed and form member 22 is extended to the generally cylindrical forming position (FIG. 2). The bottom cap 39 is also removed to expose bellows 32. A condom 12 is placed at the tip 41 of the forming member 22 and is unrolled by rolling the ring 14 along the outer surface 28 of the forming member 22, until the ring is engaged in groove 26. The circumference of the surface of the groove 26 is greater than the inner circumference of the ring in relaxed condition, causing the ring to be tensioned about the groove surface to form the desired sealing relationship.

Grasping the rib 40 of base 20 as shown in FIG. 1, the user 42 operates the bellows 32 with his thumb to create an inflating pressure condition in the pressure chamber 30 formed with the condom membrane 16. Achievement of the proper inflation is indicated by deformation of indicator diaphragm 36 to a predetermined protruding position, selected to be of a level to cause detectable loss of air from the chamber through the membrane if the membrane has porosity in excess of a predetermined maximum degree. Once the inflated condition is achieved, the user observes the indicator for a predetermined length of time, e.g., 30 seconds, to determine whether sufficient inflation is maintained for that period, indicating that the membrane is in condition for use. The condom 12 is then removed by rolling the ring 14 along the forming member toward the tip 41, thus rolling the membrane 16 about the ring, to achieve a compact package ready for use.

If inflation is not maintained for the required length of time, an undesirable degree of membrane porosity is indicated and the prophylactic should not be used.

Other embodiments are within the following claims. For example, other pressurizing means may be suitably employed in place of the bellows and one-way valve, e.g., lung power or a pressure cannister. The device may be constructed to allow pressurizing fluid to be delivered directly into the chamber space between the condom and the forming member, thus not requiring pressurization of the inner volume of the forming member or base. Also, other means may be employed for indication of the condition of inflation, e.g., a pressure gauge, and the indicator may be sensitive to a condition other than pressure, e.g., size. Also, the pressurizing fluid, e.g., if delivered from a pressure cannister, may, as an important aspect, incorporate an antiseptic for coating the inner surface of the membrane for increased prophylatic effect, as described more fully below.

Referring to the embodiment of Fig. 4, cap 38' which snap fits upon the cylindrical base 20, has an upstanding annular wall 42 forming a storage compartment for three pretested condoms. A second cap, 38" is threaded to the exterior of wall 42 and closes the compartment. This device thus enables the user to pretest the condoms at his convenience and have them ready as the situation may require.

Referring to the embodiment of FIG. 5, a reservoir for a fluid composition, shown schematically at 60, is associated with the device. The bellows includes on aspirating head 62 which enables the flow of the air from the bellows to draw with it fluid from the reservoir. In a carburetor or perfume atomizer fashion, fluid is carried with the air propelled by the bellows into the condom to thoroughly coat its interior.

As has been reported from in vitro tests, spermicides such as nonoxynol-9 which are compatible with the skin, are effective to deactivate the AIDs virus. It is believed that, by pre-applying the composition to the inner wall of the condom during test, the composition will add an important safety factor in case leaks should develop during use.

There may be situations where users forego the testing feature and utilize principles of the invention solely for the pre-application of antiseptic that is effective against AIDS and other viruses and organisms, e.g., by the use of nonoxynal-9, the spermicide mentioned above. A device for such use is illustrated in FIG. 6. It comprises a specially shaped aerosol can having a diameter suitable for insertion into a condom, e.g., 1 inch, and a length, 6 to 8 inches for enabling the full length of the condom to be unrolled about it. This aerosol cannister contains a propellant compatible with the selected antiseptic or spermicide.

As shown, a special cap-like member 72 having a smooth rounded end closely surrounds the aerosol can, and is joined to and protects the nozzle 74 from abrasive contact with the condom, while providing an aperture 72a from which the aerosol spray may emerge to fill the condom. This cap like-member also has skirt 72b extending along a substantial length of the can, corresponding with the length of the condom to be prepared. In a position corresponding to the ring of the condom, the skirt defines a detent ring 72c for retaining the ring, preferably in a sealed position. Beyond detent 72c the cap flares at 72d to provide finger grips. If the user grips the flare with his index and second finger, and presses upon the bottom of the can with his thumb, the rounded end of the cap will depress and actuate the nozzle to spray the effective composition into the condom.

By suitable provision, this action may also inflate the condom sufficiently to perform a leak test as discussed above.

Upon completion of the desired steps, the condom may be rolled along the exterior of the cap or other structure of the aerosol can as suggested by the dashed lines.

What is claimed is:

1. A device for preparation of a condom, the condom comprising an elongated, generally cylindrical membrane which is closed at one end and terminates at an annular ring at the other end, said device defining a circular surface adapted to receive said annular ring in sealing or retaining relationship and further adapted to define, with said membrane, a chamber, and further defining an elongated, generally cylindrical form which is adapted to extend from said circular surface into said tubular membrane, said form adapted to support said condom to enable it to be rolled upon itself into compact form after being subjected to said inflating condition, said form being collapsible when not in use, and gas inflation means for creating an inflating condition in said chamber.

2. The device of claim 1 adapted to produce within said condom a pressure of a level predetermined to cause a detectable loss of air from said chamber through said membrane if said membrane has porosity in excess of a predetermined maximum degree, and means enabling detection of loss of air from within said chamber.

3. The device of claim 1 including means associated with said gas inflation means to produce a flow of gas into the condom that delivers a composition, to reside in the condom during use, which is effective against sperm or disease organisms.

4. The device of claim 1, 2 or 3 wherein said form comprises a set of annular elements adapted to telescope between an extended, forming position and a storage position of reduced size.

5. The device of claim 1, 2 or 3 wherein said elongated, generally cylindrical forming member comprises a nest of consecutively smaller tubular sections.

6. The device of claim 1, 2 or 3 wherein said circular surface has a circumference greater than the inner circumference of the ring of said condom in relaxed state.

7. The device of claim 1, 2 or 3 wherein the inflation means comprises a bellows and a one way valve for flow of air into said chamber.

8. The device of claim 7 wherein said bellows is axially aligned with the position of the condom during test.

9. The device of claim 7 wherein said generally circular surface further defines an annular rib on said device for gripping between fingers while the thumb actuates the bellows.

10. The device of claim 1, 2 or 3 wherein the inflation means comprises an aerosol can.

11. The device of claim 10 wherein the exterior of said can is sized to enter said tubular condom, whereby the condom may be unrolled or rerolled about it.

12. The device of claim 11 wherein a cap member having a rounded end surrounds said aerosol can, the end of the cap serving to actuate a nozzle, the cap having a skirt that extends the length of the condom, said skirt defining a condom-retaining formation.

13. The device of any of the foregoing claims 1, 2 or 3 further comprising a cap defining a compartment for storage of at least one condom rolled into compact form.

14. A device for preparation of a condom, the condom comprising an elongated, generally cylindrical membrane which is closed at one end and terminates at an annular ring at the other end, said define defining a circular surface adapted to receive said annular ring in sealing or retaining relationship and further adapted to define, with said membrane, a chamber, gas inflation means for creating an inflating condition in said chamber, said inflation means comprising an aerosol can, the exterior of said can being sized to enter said tubular condom, whereby the condom may be unrolled or rerolled about it, and said device further comprising a cap member having a rounded end surrounding said aerosol can, the end of the cap serving to actuate a nozzle, the cap having a skirt that extends the length of the condom, said skirt defining a condom-retaining formation.

15. The device of claim 14 adapted to produce within said condom a pressure of a level predetermined to cause a detectable loss of air from said chamber through said membrane if said membrane has porosity in excess of a predetermined maximum degree, and means enabling detection of loss of air from within said chamber.

16. The device of claim 14 including means associated with said gas inflation means to produce a flow of gas into the condom that delivers a composition, to reside in the condom during use, which is effective against sperm or disease organisms.

17. The device of claim 14, 15 or 16 wherein formations of the skirt enable the fingers to hold it while the thumb of the user pushes the can thereby to cause the cap member to activate the spray.

18. A device for preparation of a condom, the condom comprising an elongated, generally cylindrical membrane which is closed at one end and terminates at an annular ring at the other end, said device comprising a body defining a circular surface adapted to receive said annular ring in sealing or retaining relationship and further adapted to define, with said membrane, a chamber, gas inflation means for creating an inflating condition in said chamber, and a cap adapted for removable attachment to said body and defining a compartment for storage of at least one condom rolled into compact form.

19. The device of claim 18 adapted to produce within said condom a pressure of a level predetermined to cause a detectable loss of air from said chamber through said membrane if said membrane has porosity in excess of a predetermined maximum degree, and means enabling detection of loss of air from within said chamber.

20. The device of claim 18 including means associated with said gas inflation means to produce a flow of gas into the condom that delivers a composition, to reside in the condom during use, which is effective against sperm or disease organisms.

21. A portable unit for preparation of a condom, the condom comprising an elongated, generally cylindrical membrane which is closed at one end and terminates at an annular ring at the other end, said device comprising a body defining a circular surface adapted to receive said annular ring in sealing or retaining relationship and an elongated, generally cylindrical forming member which extends from said circular surface into said tubular membrane, said device further adapted to define, with said membrane, a chamber, gas inflation means for creating an inflating condition in said chamber of a level of pressure predetermined to cause a detectable loss of air from said chamber through said membrane if said membrane has porosity in excess of a predetermined maximum degree, means enabling detection of loss of air from within said chamber, said forming member adapted to support said condom to enable it to be unrolled or rolled upon itself into compact form after being subjected to said inflating condition, and a cap adapted for removable attachment to said body and defining a cavity for storage of condom rolled into compact form.

22. A portable unit for preparation of a condom, the condom comprising an elongated, generally cylindrical membrane which is closed at one end and terminates at an annular ring at the other end, said device defining a circular surface adapted to receive said annular ring in sealing or retaining relationship and an elongated, generally cylindrical forming member which extends from said circular surface into said tubular membrane, said device further adapted to define, with said membrane, a chamber, said forming member being collapsible when not in use, gas inflation means for creating an inflating condition in said chamber of a level of pressure predetermined to cause a detectable loss of air from said chamber through said membrane if said membrane has porosity in excess of a predetermined maximum degree, means enabling detection of loss of air from within said chamber, said forming member adapted to support said condom to enable it to be unrolled or rolled upon itself into compact form after being subjected to said inflating condition, and means associated with said gas inflation means to produce a flow of gas into the condom that delivers a composition, to reside in the condom during use, which is effective against sperm and disease organisms.

* * * * *